(12) United States Patent
Cowgill

(10) Patent No.: US 8,256,397 B2
(45) Date of Patent: Sep. 4, 2012

(54) ENGINE INCLUDING INTAKE VACUUM MANAGEMENT SYSTEM

(75) Inventor: Joel Cowgill, White Lake, MI (US)

(73) Assignee: GM Global Technology Operations LLC

( * ) Notice: Subject to any disclaimer, the term of this patent is extended or adjusted under 35 U.S.C. 154(b) by 341 days.

(21) Appl. No.: 12/689,000

(22) Filed: Jan. 18, 2010

(65) Prior Publication Data

US 2011/0174269 A1 Jul. 21, 2011

(51) Int. Cl.
*F02D 11/10* (2006.01)
*F02D 11/00* (2006.01)
(52) U.S. Cl. ...................... 123/321; 123/90.15
(58) Field of Classification Search .................. 123/321, 123/90.15, 90.17, 322, 345, 346, 347, 348
See application file for complete search history.

(56) References Cited

U.S. PATENT DOCUMENTS

| 6,863,048 B2 * | 3/2005 | Burkhard et al. ............. 123/325 |
| 2004/0231325 A1 * | 11/2004 | Nichols ............................ 60/297 |
| 2010/0282216 A1 * | 11/2010 | Hisaminato et al. ......... 123/48 R |

* cited by examiner

*Primary Examiner* — Mahmoud Gimie
(74) *Attorney, Agent, or Firm* — Harness, Dickey & Pierce, P.L.C.

(57) ABSTRACT

An engine assembly may include an engine structure defining a first intake port in communication with a combustion chamber, an intake manifold, a vacuum actuated mechanism, a first intake valve, and a valve actuation assembly. The vacuum actuated mechanism may include a vacuum chamber in communication with the intake manifold. The first intake valve may open and close the first intake port. The valve actuation assembly may be engaged with the first intake valve and may be operated in first and second modes. The first mode may provide a first opening duration of the first intake valve during one of an intake stroke and a compression stroke of a piston located in the combustion chamber. The second mode may provide a second opening duration of the first intake valve that is different than the first opening duration, providing reduced intake manifold pressure.

20 Claims, 8 Drawing Sheets

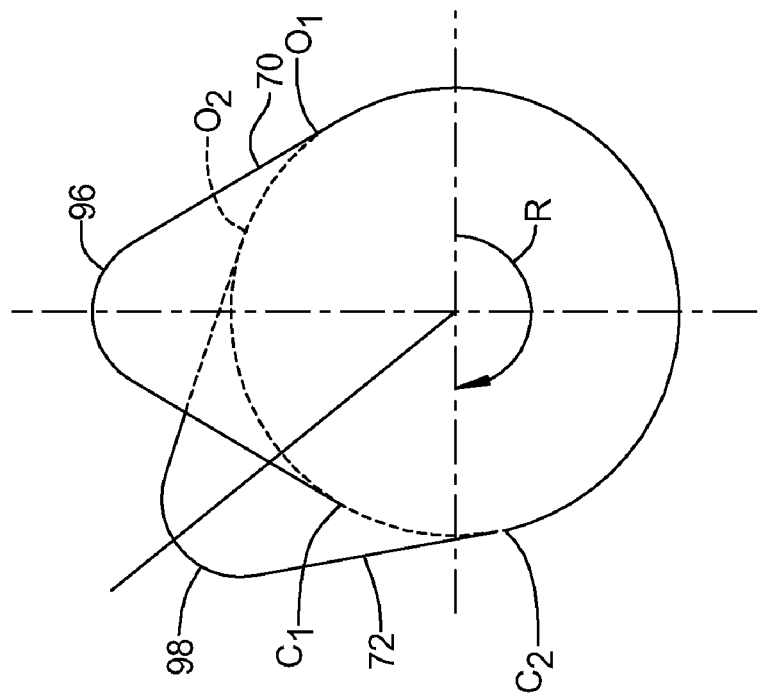
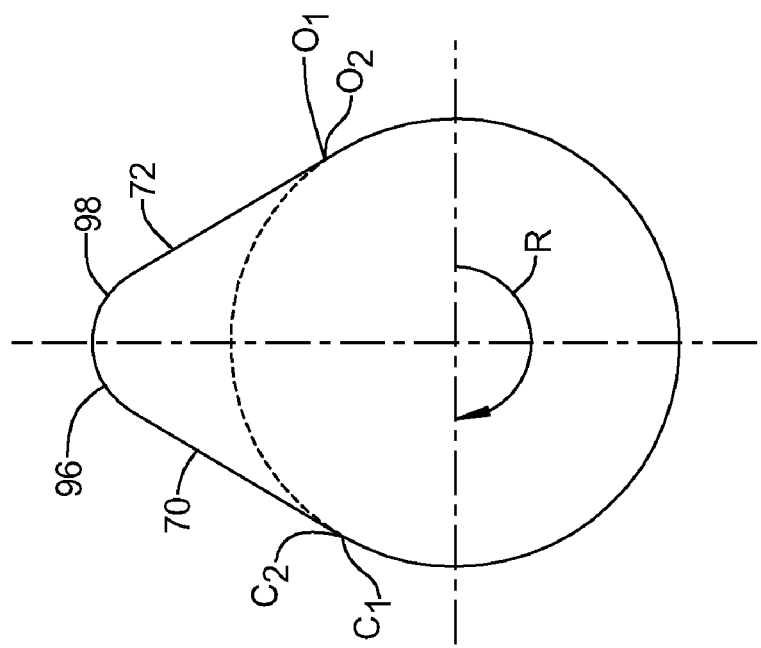

ENGINE INCLUDING INTAKE VACUUM MANAGEMENT SYSTEM

FIELD

The present disclosure relates to engine assemblies, and more specifically to intake vacuum management systems.

BACKGROUND

This section provides background information related to the present disclosure which is not necessarily prior art.

Internal combustion engines may combust a mixture of air and fuel in cylinders and thereby produce drive torque. Air and fuel flow into and out of the cylinders may be controlled by a valvetrain. The valvetrain may include a camshaft that actuates intake and exhaust valves and thereby controls the timing and amount of air and fuel entering the cylinders and exhaust gases leaving the cylinders. The timing of the intake valve or throttle body opening may control air pressure (vacuum) within the intake manifold at less than full engine load.

SUMMARY

An engine assembly may include an engine structure, a piston, an intake manifold, a vacuum actuated mechanism, a first intake valve, and a valve actuation assembly. The engine structure may define a combustion chamber and a first intake port in communication with the combustion chamber. The piston may be located within the combustion chamber and may be reciprocally displaceable from a top dead center position to a bottom dead center position during an intake stroke and displaceable from the bottom dead center position to the top dead center position during a compression stroke immediately subsequent the intake stroke. The intake manifold may be in communication with the first intake port. The vacuum actuated mechanism may include a vacuum chamber in communication with the intake manifold. The first intake valve may be supported by the engine structure and may selectively open and close the first intake port. The valve actuation assembly may be engaged with the first intake valve and may be operable in first and second modes. The valve actuation assembly may be operated in the first mode when an operating pressure in the vacuum chamber is below a predetermined limit and may be operated in the second mode when the operating pressure in the vacuum chamber is above the predetermined limit. The first mode may provide a first opening duration of the first intake valve during one of the intake stroke and the compression stroke and the second mode may provide a second opening duration of the first intake valve during one of the intake stroke and the compression stroke that is different than the first opening duration to produce a greater vacuum in the intake manifold.

A method of operating the engine assembly of the present disclosure may include determining an operating pressure of a vacuum actuated mechanism in communication with an intake manifold of the engine assembly. The method may additionally include opening a first intake valve to provide communication between a combustion chamber of the engine assembly and the intake manifold for a first opening duration during one of an intake stroke of a piston located within the combustion chamber and a compression stroke immediately subsequent the intake stroke when the determined operating pressure is below a first predetermined limit. The first intake valve may be opened to provide communication between the combustion chamber and the intake manifold for a second opening duration during the one of the intake stroke and the compression stroke when the determined operating pressure is above the first predetermined limit. The second opening duration may be different than the first opening duration to reduce an operating pressure within the intake manifold.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

FIG. 8 is a schematic illustration of an intake cam lobe of the engine assembly of FIG. 2 in an advanced position;

FIG. 9 is a schematic illustration of the intake cam lobe of FIG. 8 in a retarded position;

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Figure 1:
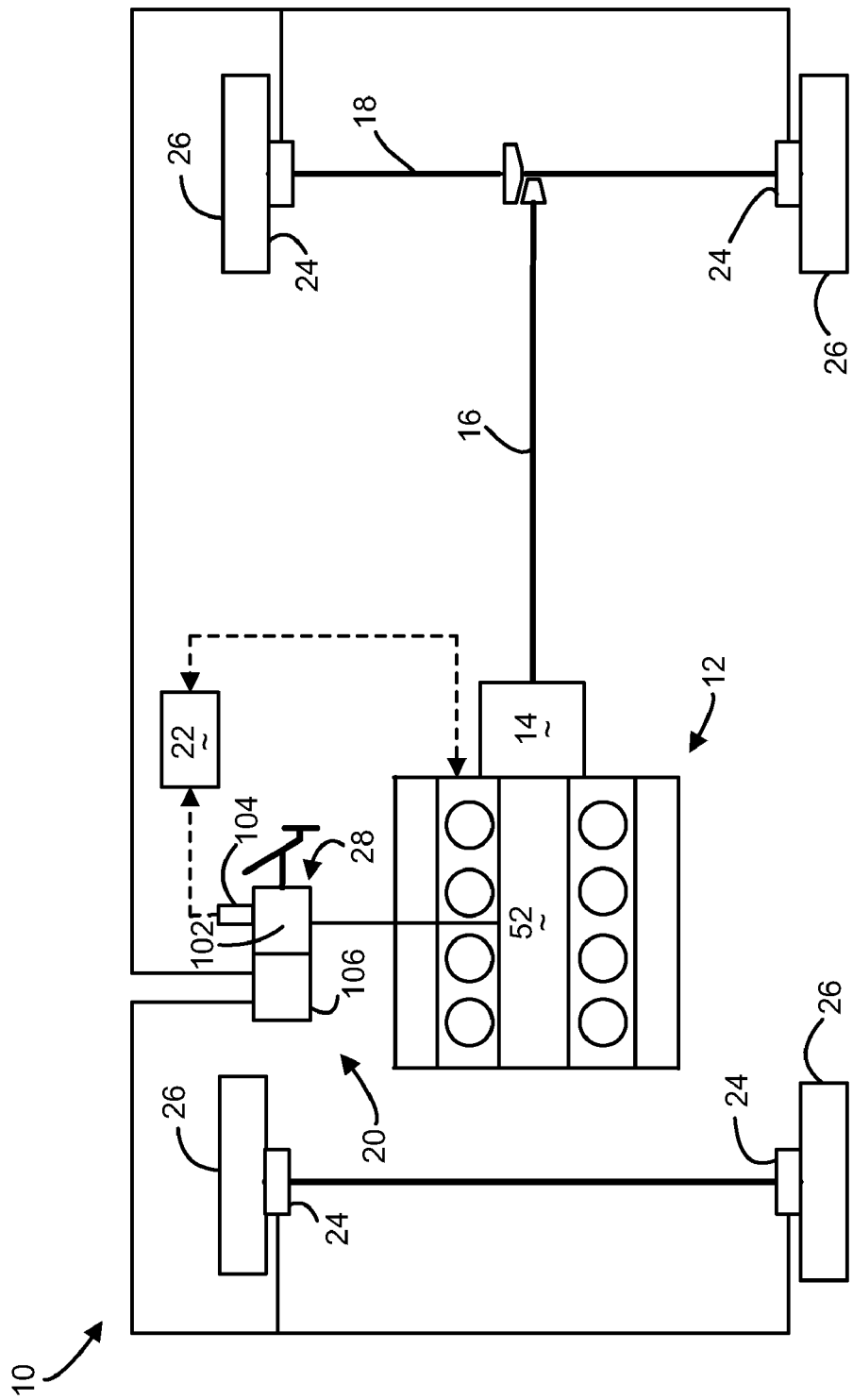
FIG. 1 is a schematic illustration of a vehicle assembly according to the present disclosure.

With reference to FIG. 1, a vehicle assembly 10 is illustrated. The vehicle assembly 10 may include an engine assembly 12, a transmission 14, an output shaft 16, a drive axle 18, a brake system 20, and a control module 22. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The brake system 20 may include brakes 24 (i.e., calipers, etc.) associated with each of the wheels 26 of the vehicle assembly 10. The transmission 14 may be engaged with the engine assembly 12 and use power from the engine assembly 12 to drive the output shaft 16 and power rotation of the drive axle 18.

Figure 2:
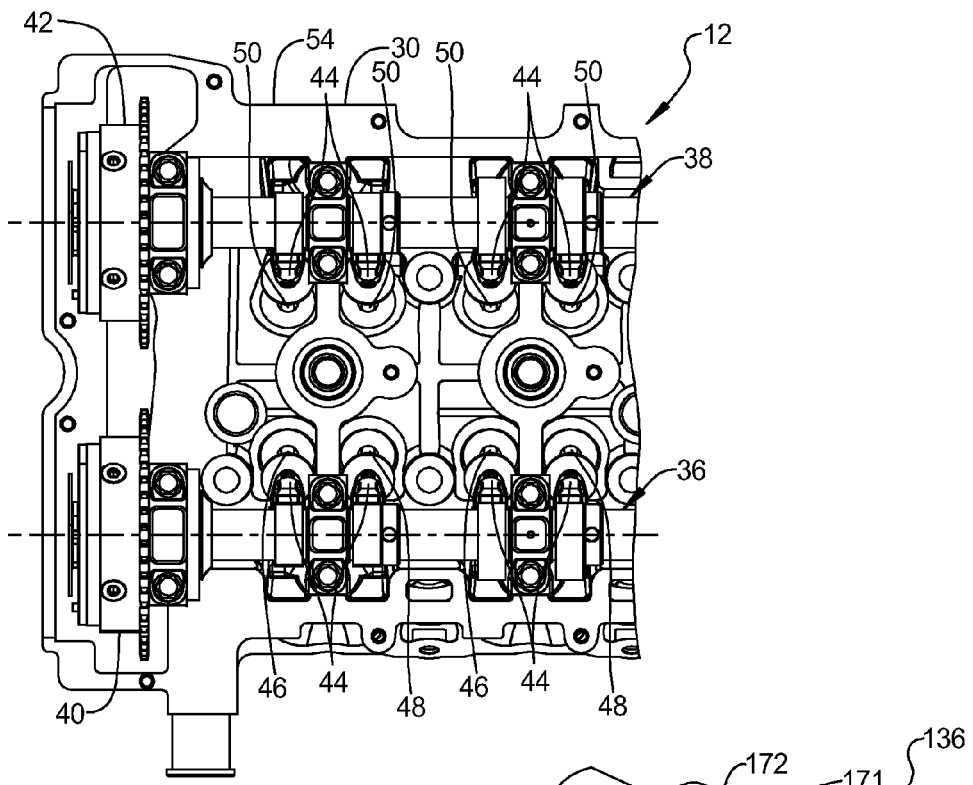
FIG. 2 is a fragmentary plan view of the engine assembly of FIG. 1.
Figure 3:
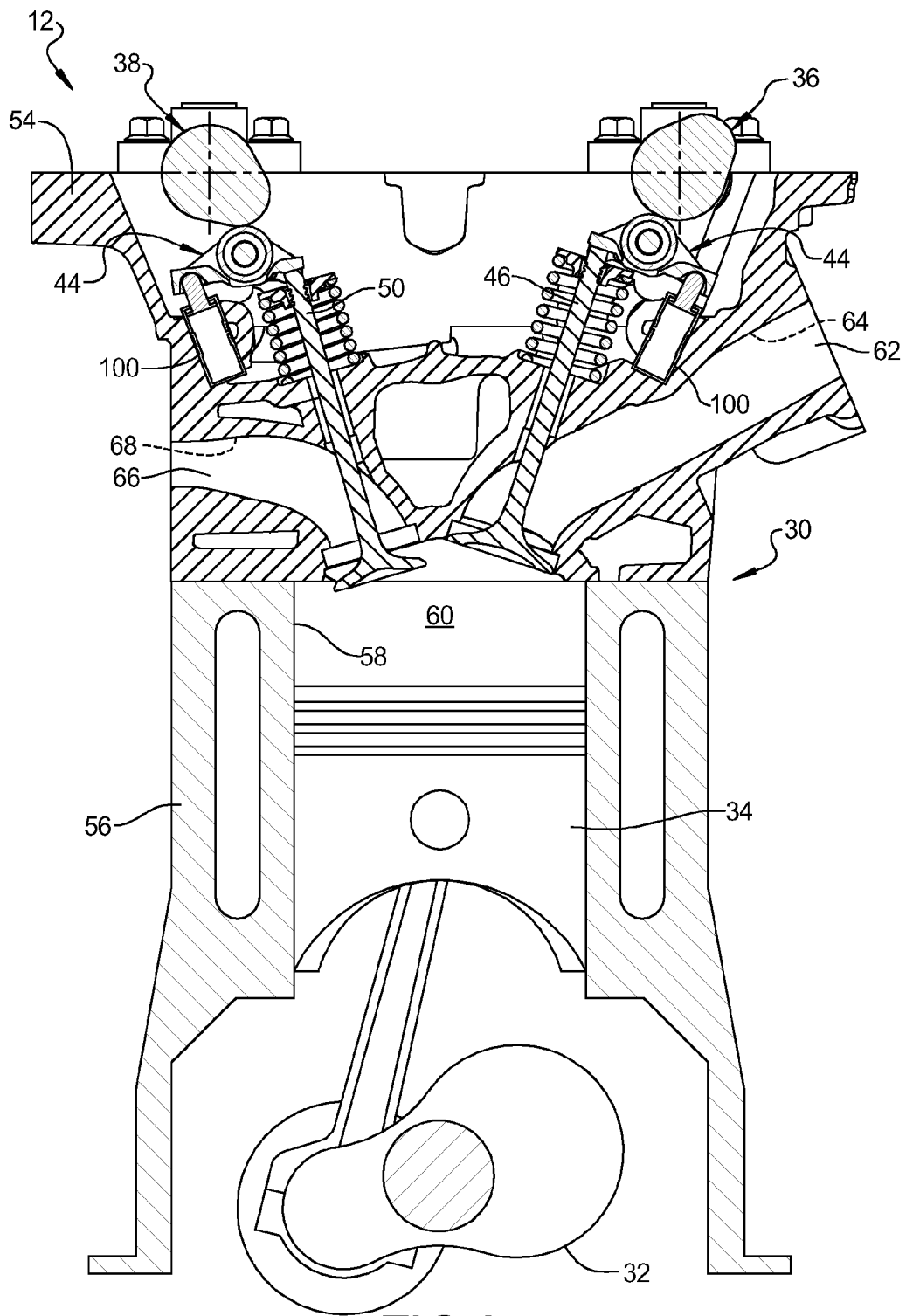
FIG. 3 is a schematic section view of the engine assembly of FIG. 1.

With additional reference to FIGS. 2 and 3, the engine assembly 12 may include a vacuum actuated mechanism 28 (FIG. 1), an engine structure 30, a crankshaft 32 rotationally supported by the engine structure 30, pistons 34 coupled to the crankshaft 32, intake and exhaust camshaft assemblies 36, 38 rotationally supported on the engine structure 30, intake and exhaust cam phasers 40, 42, valve lift assemblies 44, first and second intake valves 46, 48, exhaust valves 50, and an intake manifold 52 (FIG. 1). In the present non-limiting example, the engine assembly 12 is shown as a dual overhead camshaft engine with the engine structure 30 including a cylinder head 54 rotationally supporting the intake and exhaust camshaft assemblies 36, 38. However, it is understood that the present disclosure is not limited to overhead camshaft configurations The engine block 56 may define cylinder bores 58. The cylinder head 54 and the cylinder bores 58 in the engine block 56 may cooperate to define combustion chambers 60. The pistons 34 may be disposed within the combustion chambers 60. As seen in FIG. 3, the cylinder head 54 may define first and second intake ports 62, 64 and first and second exhaust ports 66, 68 for each combustion chamber 60. The first intake valves 46 may open and close the first intake ports 62 and the second intake valves 48 may open and close the second intake ports 64. The combination of the intake camshaft assembly 36 and the intake cam phaser 40 may form a valve actuation assembly. The valve lift assemblies 44 may be engaged with the intake camshaft assembly 36 and the first and second intake valves 46, 48 to open the first and second intake ports 62, 64.

Figure 4:
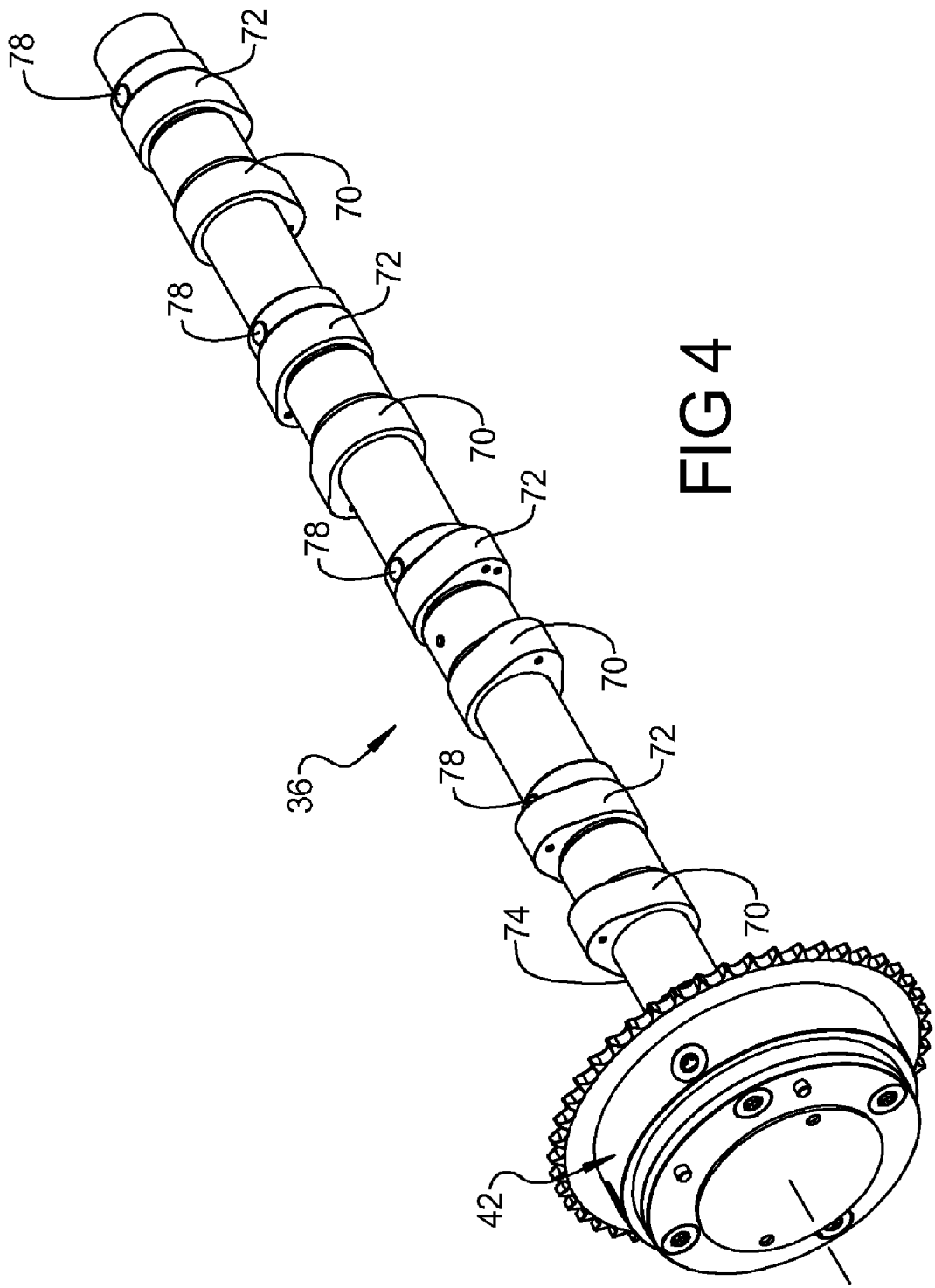
FIG. 4 is a perspective view of the intake cam phaser and intake camshaft assembly shown in FIG. 2.
Figure 5:
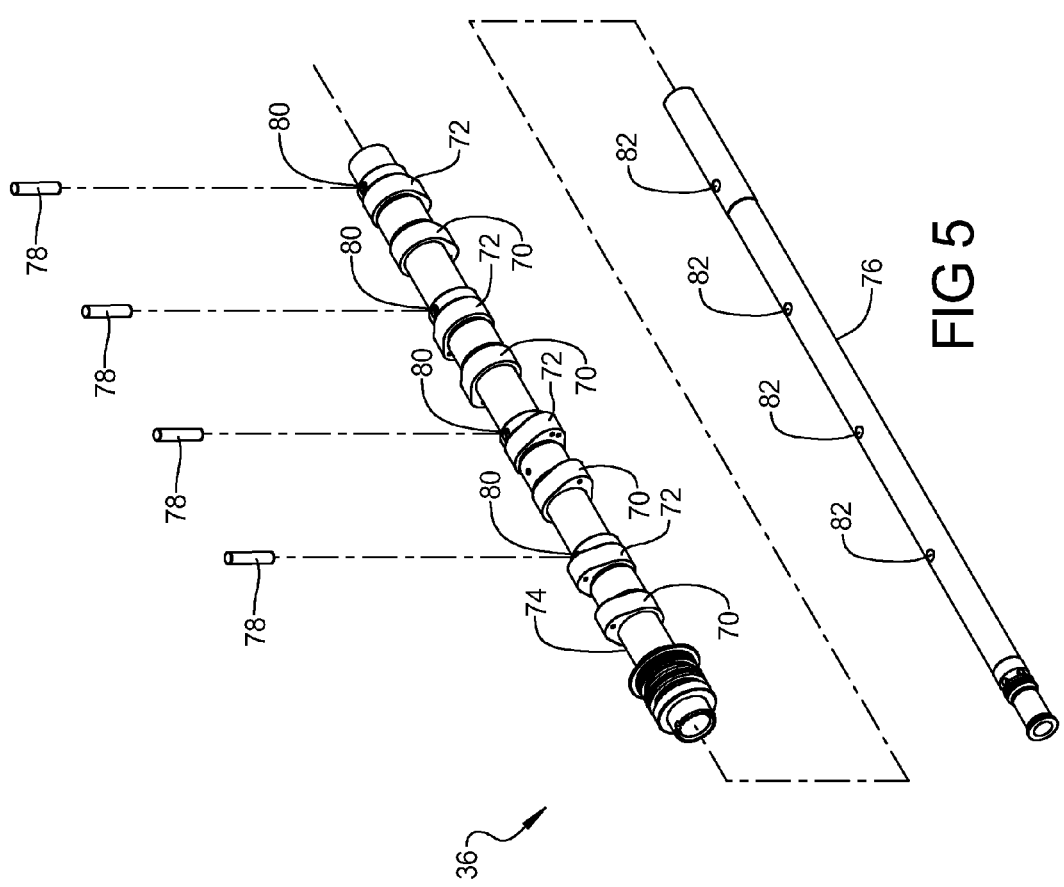
FIG. 5 is an exploded perspective view of the intake camshaft assembly shown in FIG. 2.

By way of non-limiting example, as seen in FIGS. 4 and 5, the intake camshaft assembly 36 may include first and second intake lobes 70, 72 and first and second shafts 74, 76. However, the present disclosure equally applies to traditional fixed lobe camshaft assemblies and is in no way limited to the concentric camshaft assembly described. The first shaft 74 may be rotationally supported by the engine structure 30 and the second shaft 76 may be coaxial with and rotatable relative to the first shaft 74. By way of non-limiting example, the second shaft 76 may be rotationally supported within the first shaft 74. The first intake lobes 70 may be located on and fixed for rotation with the first shaft 74. The second intake lobes 72 may be rotationally supported on the first shaft 74 and fixed for rotation with the second shaft 76. By way of non-limiting example, the second intake lobes 72 may be coupled to the second shaft 76 by pins 78 extending through apertures 80 in the second intake lobes 72 and apertures 82 in the second shaft 76.

Figure 6:
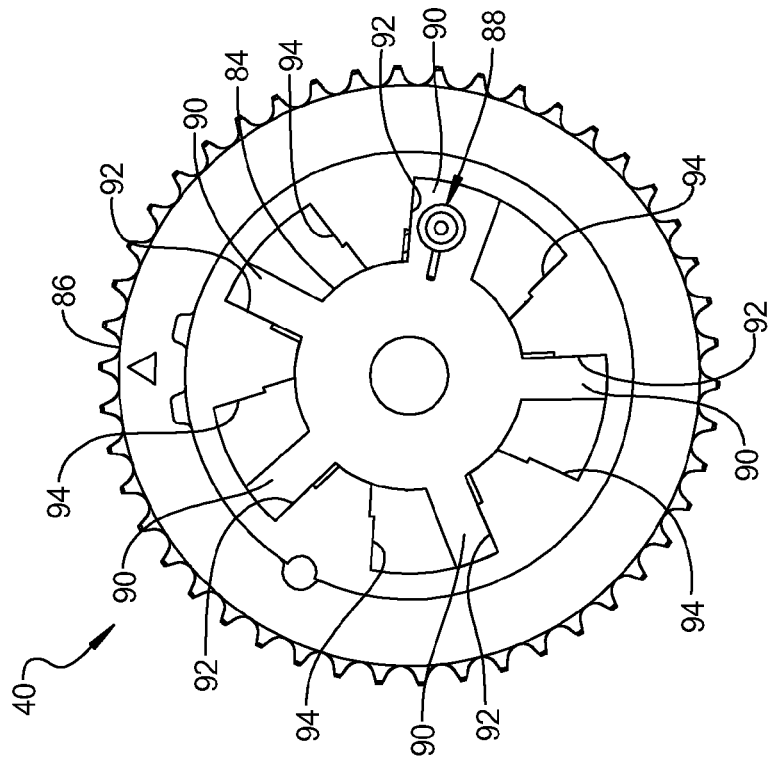
FIG. 6 is a schematic illustration of the intake cam phaser of FIG. 2 in an advanced position.
Figure 7:
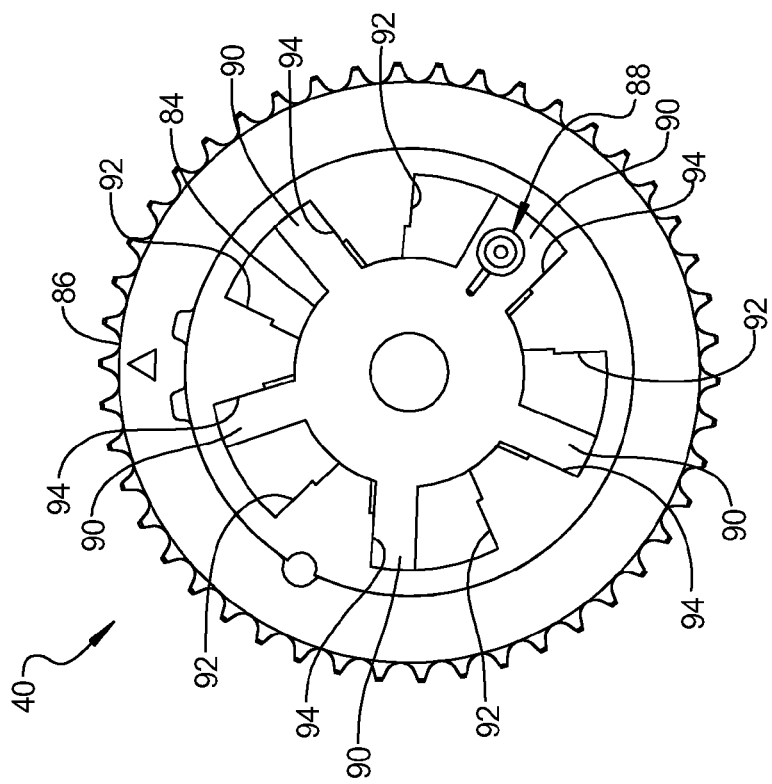
FIG. 7 is a schematic illustration of the intake cam phaser of FIG. 2 in a retarded position.

As seen in FIGS. 6 and 7, the intake cam phaser 40 may include a rotor 84, a stator 86 and a lock mechanism 88. The stator 86 may be rotationally driven by the crankshaft 32 via a drive mechanism, such as a belt or a chain, (not shown) and the rotor 84 may be rotationally supported within the stator 86. By way of non-limiting example, the rotor 84 may include radially extending vanes 90 cooperating with the stator 86 to define hydraulic advance and retard chambers 92, 94 in communication with pressurized fluid, such as oil. However, while illustrated as a hydraulically actuated vane phaser, it is understood that the present disclosure applies equally to any type of cam phaser arrangement.

The first shaft 74 (and therefore first intake lobes 70) may be fixed for rotation with the stator 86 and the second shaft 76 (and therefore second intake lobes 72) may be fixed for rotation with the rotor 84. The rotor 84 may be displaced between an advanced position (FIG. 6) and a retarded position (FIG. 7) to vary the opening timing of the second intake valves 48.

The first and second intake lobes 70, 72 are illustrated in FIGS. 8 and 9. The first intake lobe 70 may define a first valve opening region 96 between a first starting (opening) point ($O_1$) and a first ending (closing) point ($C_1$). The second intake lobe 72 may define a second valve opening region 98 between a second starting (opening) point ($O_2$) and a second ending (closing) point ($C_2$). The intake cam phaser 40 may displace the second intake lobes 72 from a first (advanced) position (FIG. 8) to a second (retarded) position (FIG. 9) and any position therebetween.

In the advanced position, the first and second starting points ($O_1$, $O_2$) may be rotationally aligned with one another and the first and second ending points ($C_1$, $C_2$) may be rotationally aligned with one another. In the retarded position, the first and second starting points ($O_1$, $O_2$) may be rotationally offset from one another and the first and second ending points ($C_1$, $C_2$) may also be rotationally offset from one another. More specifically, the second starting point ($O_2$) may be located behind the first starting point ($O_1$) in the rotational direction (R). The second ending point ($C_2$) may also be located behind the first ending point ($C_1$) in the rotational direction (R). However, it is understood that the present disclosure is not limited to such arrangements.

By way of non-limiting example, the second intake lobe 72 may provide a first opening duration for the second intake valve 48 during an expansion portion of an intake stroke of the piston 34 when in the retarded position (FIG. 9) and a second opening duration for the second intake valve 48 during the expansion portion of the intake stroke of the piston 34 when in the advanced position (FIG. 8). By way of non-limiting example, the second opening duration may be at least ten percent greater than the first opening duration. The second opening duration may include at least ten cam degrees more of valve opening during the expansion portion of an intake stroke than the first opening duration. Therefore, the valve actuation assembly formed by the intake camshaft assembly 36 and the intake cam phaser 40 may control intake valve timing, and therefore vacuum within the intake manifold 52 as discussed below.

The second intake lobe 72 may additionally provide a third opening duration for the second intake valve 48 during a compression stroke of the piston 34 immediate subsequent the expansion stroke when in the retarded position (FIG. 9) and a fourth opening duration during the compression stroke when in the advanced position (FIG. 8). By way of non-limiting example, the third opening duration may be at ten percent greater than the fourth opening duration. The third opening duration may include at least ten cam degrees more of valve opening during the compression stroke than the fourth opening duration.

In the example discussed above, the first opening duration increases as the third opening duration decreases and the second opening duration increases as the fourth opening duration decreases. However, the present disclosure applies equally to arrangements where the opening duration of the intake valve 48 during the expansion stroke remains constant while the opening duration of the intake valve 48 during the compression stroke varies. The present disclosure also applies equally to arrangements where the opening duration of the intake valve 48 during the expansion stroke varies while the opening duration of the intake valve 48 during the compression stroke remains constant. Therefore, it is understood that the vacuum within the intake manifold 52 may be increased by increasing the opening duration of the intake valve 48 during the expansion stroke, decreasing the opening duration of the intake valve 48 during the compression stroke, or both increasing the opening duration of the intake valve 48 during the expansion stroke and decreasing the opening duration of the intake valve 48 during the compression stroke.

Figure 10:
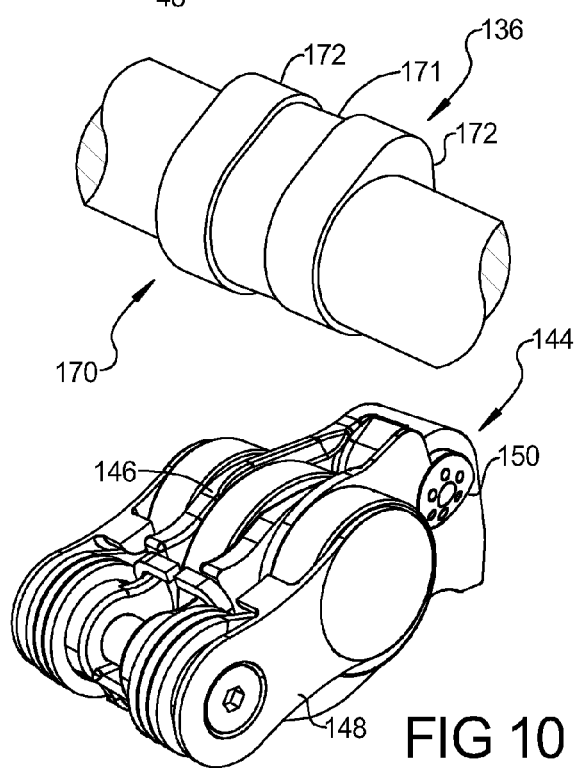
FIG. 10 is a fragmentary perspective illustration of an alternate camshaft assembly and valve lift assembly according to the present disclosure.

An alternate valve actuation assembly may be formed by the valve lift assembly 144 and intake camshaft 136 illustrated in FIG. 10. By way of non-limiting example, the valve lift assembly 144 may form a multi-step rocker arm assembly including a main body 146, an arm assembly 148, and a locking mechanism 150. The main body 146 may be engaged with an intake valve at a first end and engaged with and pivotally supported by the engine structure at a second end. By way of non-limiting example, the main body 146 may be supported by a hydraulic lash adjuster 100 (FIG. 3) and the lash adjuster 100 may provide pressurized oil to the valve lift assembly 144 to switch the valve lift assembly 144 between first and second lift modes (discussed below).

The arm assembly 148 may be rotatably coupled to the main body 146. The locking mechanism 150 may be coupled to the main body 146 and selectively engaged with the arm assembly 148. During operation, the valve lift assembly 144 may be switched between the first and second lift modes by actuating the locking mechanism 150. The locking mechanism 150 may be actuated by pressurized oil from the lash adjuster 100. In the first lift mode, the locking mechanism 150 disengages the arm assembly 148, allowing relative displacement between the arm assembly 148 and the main body 146. In the second lift mode, the locking mechanism 150 engages the arm assembly 148, fixing the main body 146 for displacement with the arm assembly 148. While described as providing two distinct lift conditions, it is understood that the present disclosure is not limited to such arrangements. By way of non-limiting example, the present disclosure applies equally to systems including any number of distinct lift conditions as well as continuously variable lift arrangements.

The intake camshaft 136 may include an intake lobe 170 engaged with the valve lift assembly 144. The intake lobe 170 may include a primary lobe 171 and secondary lobes 172. The primary lobe 171 may be engaged with the main body 146 of the valve lift assembly 144 and the secondary lobes 172 may be engaged with the arm assembly 148. In the first lift mode, the secondary lobes 172 may displace the arm assembly 148 relative to the main body 146 and the primary lobe 171 may displace the valve lift assembly 144 to provide a first intake valve opening duration. In the second lift mode, the secondary lobes 172 may displace the main body 146 with the arm assembly 148 to provide a second intake valve opening duration.

The second intake valve opening duration may be greater than the first intake valve opening duration. More specifically, the second intake valve opening duration may provide a greater intake valve opening duration during an expansion portion of an intake stroke of the piston associated with the intake valve than the first intake valve opening duration to reduce intake manifold pressure. By way of non-limiting example, the second intake valve opening duration during the expansion portion of the intake stroke may be at least ten percent greater than the first intake valve opening duration during the expansion portion of the intake stroke. Alternatively, the first intake valve opening duration may provide a reduced intake valve opening duration during a compression stroke immediately after the intake stroke to reduce intake manifold pressure. By way of non-limiting example, the first intake valve opening duration during the compression stroke may be at least ten percent less than the second intake valve opening duration during the compression stroke.

Further, it is understood that the variation in intake manifold pressure may be controlled by the intake cam phaser 40, the valve lift assembly 144, or a combination of cam phasing and valve lift adjustment.

Figure 11:
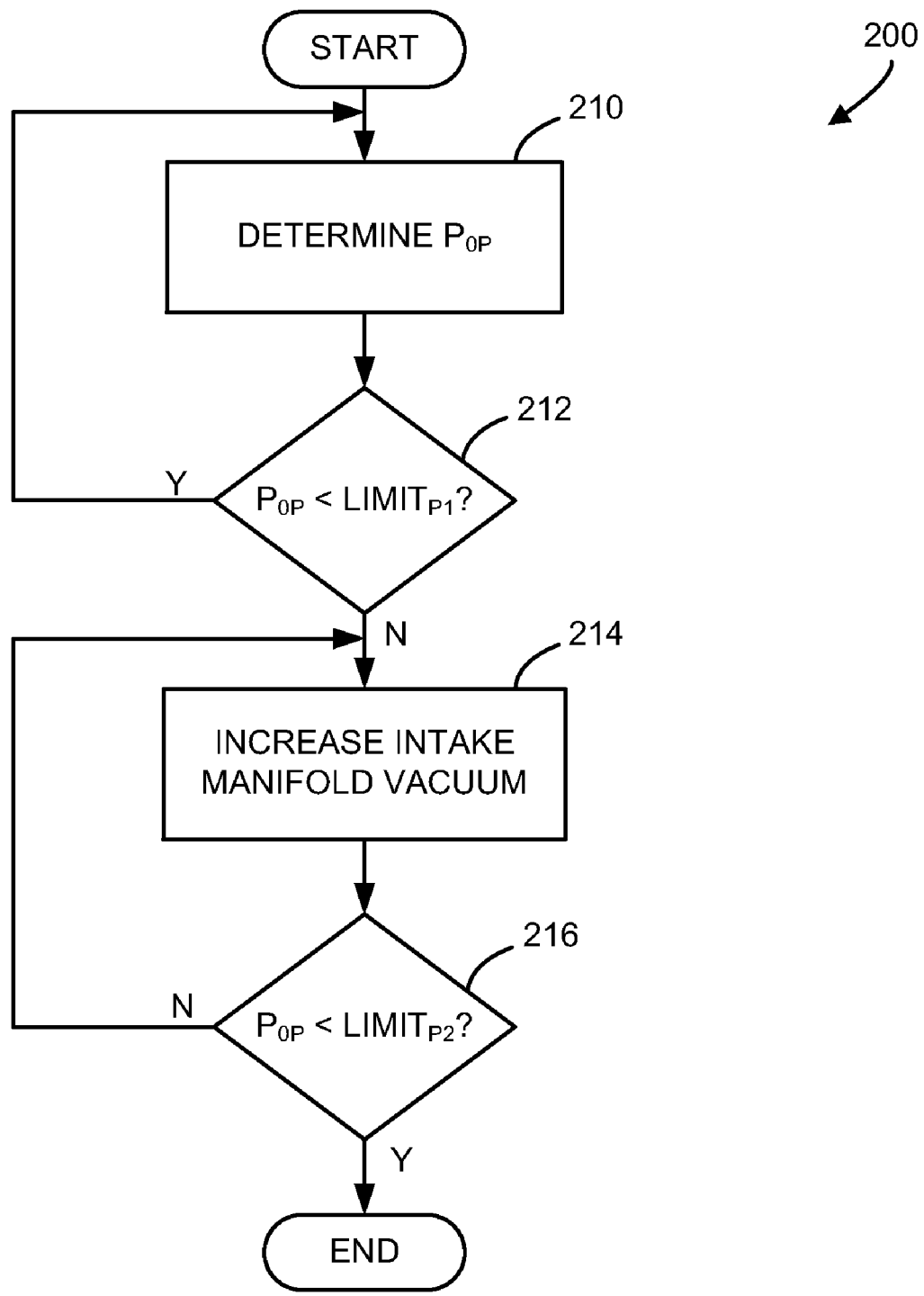
FIG. 11 is a flow chart illustrating engine operation according to the present disclosure.

FIG. 11 illustrates a non-limiting example of control logic 200 for engine operation according to the present disclosure. Control logic 200 may continuously loop during engine operation. Control logic 200 begins at step 210 where the operating pressure ($P_{OP}$) within the vacuum actuated mechanism 28 is determined. In the present non-limiting example, the vacuum actuated mechanism 28 may form a vacuum assisted brake booster and may include a vacuum chamber 102 and a pressure sensor 104 (FIG. 1). The vacuum chamber 102 may form an accumulator and may be in communication with the intake manifold 52 and the pressure sensor 104 may be in communication with the control module 22 and provide a signal indicative of the pressure within the vacuum chamber 102. The vacuum actuated mechanism 28 (vacuum assisted brake booster) may be in communication with a master cylinder assembly 106 of the brake system 20.

The operating pressure ($P_{OP}$) is then evaluated relative to a first predetermined limit ($LIMIT_{P1}$) at step 212. The first predetermined limit ($LIMIT_{P1}$) may correspond to a vacuum level required for proper operation of the vacuum actuated mechanism 28. If the operating pressure ($P_{OP}$) is below the first predetermined limit ($LIMIT_{P1}$), indicating sufficient vacuum in the vacuum chamber 102, control logic 200 may return to step 210. If the operating pressure ($P_{OP}$) is above the first predetermined limit ($LIMIT_{P1}$), indicating insufficient vacuum, control logic 200 may proceed to step 214 where the valve actuation assembly increases the vacuum level in the intake manifold 52, and therefore in the vacuum chamber 102 as well.

In the first example discussed above, the second intake lobe 72 may be displaced to the advanced position (FIG. 8) to provide the second opening duration for the second intake valve 48 and increase vacuum in the intake manifold 52. While illustrated as being in a fully advanced position, it is understood the present disclose applies to any position providing increased valve opening during the expansion portion of the intake stroke. The advanced position may also provide a reduced opening duration of the intake valve 48 during the compression stroke and increase vacuum in the intake manifold 52. In the second example, the valve lift assembly 144 may be switched to the second lift mode to provide the second intake valve opening duration and increase intake manifold vacuum.

Control logic 200 may then proceed to step 216 where the operating pressure ($P_{OP}$) is again evaluated. Specifically, the operating pressure ($P_{OP}$) is evaluated relative to a second predetermined limit ($LIMIT_{P2}$) at step 216. The second predetermined limit ($LIMIT_{P2}$), may corresponding to a full charge vacuum level in the vacuum chamber 102. If the operating pressure ($P_{OP}$) is below the second predetermined limit ($LIMIT_{P2}$), indicating full charge vacuum in the vacuum chamber 102, control logic 200 may terminate and start over again. If the operating pressure ($P_{OP}$) is above the second predetermined limit ($LIMIT_{P2}$), control logic 200 may proceed to step 214 where the valve actuation assembly continues operation to increase the vacuum level in the intake manifold 52, and therefore in the vacuum chamber 102 as well.

What is claimed is:

1. An engine assembly comprising:
   an engine structure defining a combustion chamber and a first intake port in communication with the combustion chamber;
   a piston located within the combustion chamber and reciprocally displaceable from a top dead center position to a bottom dead center position during an intake stroke and displaceable from the bottom dead center position to the top dead center position during a compression stroke immediately subsequent the intake stroke;
   an intake manifold in communication with the first intake port;

a vacuum actuated mechanism including a vacuum chamber in communication with the intake manifold;
a first intake valve supported by the engine structure and selectively opening and closing the first intake port; and
a valve actuation assembly engaged with the first intake valve and operable in first and second modes, the valve actuation assembly operated in the first mode when an operating pressure in the vacuum chamber is below a predetermined limit and operated in the second mode when the operating pressure in the vacuum chamber is above the predetermined limit, the first mode providing a first opening duration of the first intake valve during one of the intake stroke and the compression stroke and the second mode providing a second opening duration of the first intake valve during the one of the intake stroke and the compression stroke that is different than the first opening duration to produce a greater vacuum in the intake manifold than the first opening duration.

2. The engine assembly of claim 1, wherein the first and second opening durations occur during the intake stroke and the second opening duration is greater than the first opening duration.

3. The engine assembly of claim 1, wherein the first and second opening durations occur during the compression stroke and the first opening duration is greater than the second opening duration.

4. The engine assembly of claim 1, wherein the valve actuation assembly includes a multi-step valve lift mechanism engaged with the first intake valve and a camshaft rotationally supported by the engine structure and engaged with the multi-step lift mechanism, the multi-step valve lift mechanism operable in the first and second modes, the multi-step valve lift mechanism providing the first opening duration of the first intake valve during the first mode and providing the second opening duration of the first intake valve during the second mode.

5. The engine assembly of claim 1, wherein the valve actuation assembly includes a first valve lift mechanism engaged with the first intake valve, a camshaft rotationally supported by the engine structure, and a cam phaser coupled to the camshaft assembly, the camshaft assembly including a first lobe engaged with the first valve lift mechanism and rotationally displaceable from a first position during the first mode to a second position during the second mode rotationally advanced in a rotational direction of the camshaft assembly relative to the first position, the first lobe providing the first opening duration of the first intake valve when in the first position and providing the second opening duration of the first intake valve when in the second position.

6. The engine assembly of claim 5, wherein the camshaft assembly includes first and second shafts coupled to the cam phaser and rotatable relative to one another, the first lobe fixed for rotation with the first shaft and a second lobe fixed for rotation with the second shaft.

7. The engine assembly of claim 6, further comprising a second valve lift mechanism supported by the engine structure and engaged with a second valve and the second lobe to selectively open and close a second port in communication with the combustion chamber and the intake manifold.

8. The engine assembly of claim 5, wherein the second position is at least 10 cam degrees from the first position in the rotational direction of the camshaft assembly.

9. The engine assembly of claim 1, wherein the vacuum actuated mechanism includes a vacuum brake booster defining the vacuum chamber.

10. The engine assembly of claim 1, wherein the second opening duration is at least 10 percent different than the first opening duration.

11. A method comprising:
determining an operating pressure of a vacuum chamber of a vacuum actuated mechanism in communication with an intake manifold of an engine;
opening a first intake valve to provide communication between a combustion chamber of the engine and the intake manifold for a first opening duration during one of an intake stroke of a piston located within the combustion chamber and a compression stroke of the piston immediately subsequent the intake stroke when the determined operating pressure is below a first predetermined limit; and
opening the first intake valve to provide communication between the combustion chamber and the intake manifold for a second opening duration during the one of the intake stroke and the compression stroke when the determined operating pressure is above a first predetermined limit, the second opening duration being different than the first opening duration to reduce an operating pressure within the intake manifold.

12. The method of claim 11, wherein the first predetermined limit includes a pressure within the vacuum chamber required for operation of the vacuum actuated mechanism.

13. The method of claim 12, wherein the engine includes a valve actuation assembly operable in a first mode providing the opening of the first intake valve for the first duration and a second mode providing the opening of the first intake valve for the second opening duration, the valve actuation assembly being maintained in the second mode until the operating pressure of the vacuum chamber is below a second predetermined limit indicative of a full charge condition of the vacuum chamber.

14. The method of claim 11, wherein the engine includes a multi-step valve lift mechanism engaged with the first intake valve and a camshaft rotationally supported by an engine structure and engaged with the multi-step lift mechanism, the multi-step valve lift mechanism operable in first and second modes, the multi-step valve lift mechanism opening the first intake valve for the first opening duration during the first mode and opening the first intake valve for the second opening duration during the second mode.

15. The method of claim 11, wherein the engine includes a first valve lift mechanism engaged with the first intake valve, a camshaft rotationally supported by the engine, and a cam phaser coupled to the camshaft, the camshaft including a first lobe engaged with the first valve lift mechanism and rotationally displaceable from a first position during the first mode to a second position during the second mode rotationally advanced in a rotational direction of the camshaft assembly relative to the first position, the first lobe providing the first opening duration of the first intake valve when in the first position and providing the second opening duration of the first intake valve when in the second position.

16. The method of claim 15, wherein the camshaft includes first and second shafts coupled to the cam phaser and rotatable relative to one another, the first lobe fixed for rotation with the first shaft and a second lobe fixed for rotation with the second shaft.

17. The method of claim 16, wherein the second position is at least 10 cam degrees from the first position in the rotational direction of the camshaft assembly.

18. The method of claim 16, wherein a second valve lift mechanism is supported by the engine structure and engaged with a second valve and the second lobe to open a second port in communication with the combustion chamber and the intake manifold.

19. The method of claim 11, wherein the first and second opening durations occur during the intake stroke and the second opening duration is greater than the first opening duration.

20. The method of claim 11, wherein the first and second opening durations occur during the compression stroke and the first opening duration is greater than the second opening duration.

* * * * *